United States Patent
Zou et al.

(10) Patent No.: US 9,877,035 B2
(45) Date of Patent: Jan. 23, 2018

(54) QUANTIZATION PROCESSES FOR RESIDUE DIFFERENTIAL PULSE CODE MODULATION

(71) Applicant: QUALCOMM Incorporated, San Diego, CA (US)

(72) Inventors: Feng Zou, San Diego, CA (US); Joel Sole Rojals, La Jolla, CA (US); Rajan Laxman Joshi, San Diego, CA (US); Chao Pang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 14/659,358

(22) Filed: Mar. 16, 2015

(65) Prior Publication Data

US 2015/0264376 A1  Sep. 17, 2015

Related U.S. Application Data

(60) Provisional application No. 61/954,488, filed on Mar. 17, 2014.

(51) Int. Cl.
*H04N 19/126* (2014.01)
*H04N 19/463* (2014.01)
(Continued)

(52) U.S. Cl.
CPC ......... *H04N 19/463* (2014.11); *H04N 19/126* (2014.11); *H04N 19/157* (2014.11); *H04N 19/197* (2014.11)

(58) Field of Classification Search
CPC .................. H04N 19/463; H04N 19/157
See application file for complete search history.

(56) References Cited

U.S. PATENT DOCUMENTS 5,892,847 A * 4/1999 Johnson ................. H04N 19/30
                                                    375/E7.04
2007/0065026 A1   3/2007 Lee et al.
(Continued)

FOREIGN PATENT DOCUMENTS

WO       9602895 A1   2/1996
WO    2006007279 A1   1/2006

OTHER PUBLICATIONS

Balle, et al., "Extended Texture Prediction for H.264 Intra Coding", VCEG Meeting; MPEG Meeting; Jan. 15-16, 2007; Marrakech; (Video Coding Experts Group of ITU-T SG.16), No. VCEG -AE11, Jan. 14, 2007, XP030003514, ISSN: 0000-0157, 7 pp.
(Continued)

*Primary Examiner* — Zhubing Ren
(74) *Attorney, Agent, or Firm* — Shumaker & Sieffert, P.A.

(57) ABSTRACT

In an example, system and method for coding encoded video data. A quantized residue differences block associated with a current block of a picture is generated and a reconstructed prediction residue for each quantized residue difference in the block of quantized residue differences is generated. Each reconstructed prediction residue is added to its corresponding original prediction value to produce a current block of a picture. Generating the reconstructed prediction residue includes performing inverse quantization on blocks of quantized residue differences, wherein the inverse quantization reconstructs data to which uniform quantization residue differential pulse code modulation (RDPCM) has been applied and wherein the quantization is of the form:

$\Delta X_q = \text{floor}((X + \alpha Q)/Q)$ where Q is quantization step and $\alpha$ is quantization offset.

13 Claims, 7 Drawing Sheets

(51) Int. Cl.
  *H04N 19/196* (2014.01)
  *H04N 19/157* (2014.01)

(56) References Cited

U.S. PATENT DOCUMENTS

2008/0310503 A1  12/2008  Lee et al.
2010/0172582 A1* 7/2010  Ding ................... H04N 19/176
                                         382/166
2013/0251032 A1* 9/2013  Tanaka .................. H04N 19/44
                                         375/240.03
2014/0286413 A1  9/2014  Joshi et al.
2014/0294089 A1  10/2014 MacInnis et al.
2015/0049813 A1  2/2015  Tabatabai et al.
2015/0063454 A1  3/2015  Guo et al.
2016/0080748 A1  3/2016  Sasai et al.

OTHER PUBLICATIONS

Flynn, et al., "High Efficiency Video Coding (HEVC) Range Extensions text specification Draft 4," JCT-VC Meeting; Incheon, Apr. 18-26, 2013; (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005-v3, Aug. 8, 2013, XP030114950, 321 pages.
Joint Call for Proposals for Coding of Screen Content, (Visual Coding group of ITU-T SG16 Q6/16 and ISO/IEC/JTC1/SC29/WG11) presented in the Jan. 17, 2014 meeting, San Jose, California. URL: http:/lwww.itu.int/en/ITU-T/ Studygroups/com16/video/Documenls/CfP-HEVC-coding-screen-contenl.pdf. 15 pp.
Joshi et al., "AHG8: Residual DPCM for Visually Lossless Coding", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0351, Apr. 10, 2013; XP030114308, 3 pp.
Joshi, et al., "AHG8: Use of Inter RDPCM for Blocks Using Intra Block Copy Mode", JCT-VC Meeting; Oct. 23-Nov. 1, 2013, Geneva, (Joint Collaborative Team on Video Coding of ISO/IEC JTC1/SC29/WG11 and ITU-T SG.16) URL: http://wftp3.itu.int/av-arch/jctvc-site/, No. JCTVC-00170-v3, Oct. 25, 2013, XP030115198, 5 pp.
Joshi, et al., "Non-RCE2: Extension of Residual DPCM for Lossless Coding ", JCT-VC Meeting, MPEG Meeting, Apr. 18-26, 2013; Incheon; (Joint Collaborative Team on Video Coding of ISO/IEC JTC1/SC29/WG11 and ITU-T SG.16), URL: http://wftp3.itu.int/av-arch/jctvc-site/, No. JCTVC-M0288, Apr. 9, 2013 XP030114245, 5 pp.
Pang, et al., "Non-RCE3: Intra Motion Compensation with 2-D MVs", JCT-VC Meeting; Jul. 25-Aug. 2, 2013; Vienna; (Joint Collaborative Team on Video Coding of ISO/IEC JTC1/SC29/WG11 and ITU-TSG . 16 ) ; URL : http://wftp3.itu.int/av-arch/jctvc-site/, No. JCTVC-N0256-v4, Aug. 2, 2013, XP030114777, 12 pp.
Office Action from related U.S. Appl. No. 14/469,477 dated Apr. 14, 2017, (15 pages).
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Joshi, et al., "RCE2 subtest C.2: Extension of residual DPCM to lossy coding", JCT-VC Meeting; Jul. 25-Aug. 2, 2013; Vienna; (Joint Collaborative Team on Video Coding of ISO/IEC JTC1/SC29/WG11 and ITU-T SG.16 ); URL: http://wftp3.itu.int/av-arch/jctvc-site/,, No. JCTVC-N0052, Jul. 16, 2013, XP030114481, 3 pp.
Lee, et al., "AHG7: Residual DPCM for HEVC lossless coding," Samsung Electronics Co., Ltd., Joint Collaborative Team on Video Coding (JCT-VC) of ITU-T SG16 WP 3 and ISO/IEC JTC1/SC 29/WG 11, JCTVC-L0117, Jan. 14-23, 2013; 12th Meeting: Geneva, CH, Jan. 7, 2013, XP030113605, 6 pp.
Naccari, et al., "RCE2: Experimental results for Test C.1" Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013; Document: JCTVC-N0074, Jul. 12, 2013, 6 pp.
Wu, et al. "Wavelet Based Distributed Video Coding with Spatial Scalability," IEEE International Symposium on Circuits and Systems (ISCAS), May 18-21, 2008, pp. 3458-3461.
Yu, et al., "Quantization with Hard-decision Partition and Adaptive Reconstruction Levels for low delay setting," MPEG Meeting; Jan. 20-28, 2011; Daegu; (Motion Picture Expert Group or ISO/IEC JTC1/SC29/WG11), Document: JCTVC-D384; No. m19162, Jan. 23, 2011, XP030047729, 4 pp.
Zou, et al., "Quantization rounding for RDPCM," JCT-VC Meeting; Mar. 27-Apr. 4, 2014; Valencia; (Joint Collaborative Team on Video Coding of ISO/IEC JTC1/SC29/WG11 and ITU-T SG.16);

(56) References Cited

OTHER PUBLICATIONS

URL:http://wftp3.itu.int/av-arch/jctvc-site/,, No. JCTVC-Q0148, Mar. 18, 2014, XP030116083, 3 pp.

Wang, et al., "High Efficiency Video Coding (HEVC) Defect Report 2," MPEG Meeting; Oct. 23-Nov. 1, 2013; Daegu; (Motion Picture Expert Group or ISO/IEC JTC1/SC29/WG11), Document: JCTVC-O1003_v2, Nov. 24, 2013; 311 pp.

Flynn, et al., "High efficiency Video Coding (HEVC) Range Extensions text specification: Draft 6," MPEG Meeting; Jan. 9-17, 2014; Daegu; (Motion Picture Expert Group or ISO/IEC JTC1/SC29/WG11), Document: JCTVC-P1005_v1, Feb. 19, 2014, 368 pp.

Zhou, et al., "RCE2: Experimental results on Test 3 and Test 4," MPEG Meeting; Apr. 18-26, 2013; Daegu; (Motion Picture Expert Group or ISO/IEC JTC1/SC29/WG11), Document: JCTVC-M0056, Apr. 6, 2013; 13 pp.

Sole, et al., "RCE2 Test B.1: Residue rotation and significance map context," MPEG Meeting; Jul. 25-Aug. 2, 2013; Daegu; (Motion Picture Expert Group or ISO/IEC JTC1/SC29/WG11), Document: JCTVC-N0044, Jul. 9, 2013; 7 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

International Search Report and Written Opinion from International Application No. PCT/US2015/021028, dated May 26, 2015, 13 pp.

Response to Written Opinion dated May 26, 2015, from International Application No. PCT/US2015/021028, filed on Jul. 27, 2015, 10 pp.

Second Written Opinion from International Application No. PCT/US2015/021028, dated Jan. 25, 2016, 7 pp.

Response to Second Written Opinion dated Jan. 25, 2016, from International Application No. PCT/US2015/021028, filed on Mar. 24, 2016, 22 pp.

International Preliminary Report on Patentability from International Application No. PCT/US2015/021028, dated May 4, 2016, 11 pp.

\* cited by examiner

QUANTIZATION PROCESSES FOR RESIDUE DIFFERENTIAL PULSE CODE MODULATION

This application claims the benefit of U.S. Provisional Patent Application No. 61/954,488, filed Mar. 17, 2014, the entire contents of which are incorporated herein by reference.

TECHNICAL FIELD

This disclosure relates to video coding, and more particularly to techniques for encoding and decoding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4. ITU-T H.263, ITU-T H.264/MPEG-4, Part 10, Advanced Video Coding (AVC), the High Efficiency Video Coding (HEVC) standard, and extensions of such standards presently under development. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to predicting data in video coding. For example, the techniques described in this disclosure may provide support for residue differential pulse code modulation (RDPCM) in video coding. In an example, the techniques of this disclosure may include predicting and quantizing/dequantizing residual data using RDPCM.

In an example, a method of decoding video data includes generating a quantized residue differences block of a picture based on a predicted residual block, wherein generating includes applying uniform quantization RDPCM encoding to the predicted residual block.

In another example, a method of coding video data includes generating a block of quantized residue differences, generating a reconstructed prediction residue for each quantized residue difference in the block of quantized residue differences, wherein generating includes performing inverse quantization on blocks of quantized residue differences, wherein the inverse quantization reconstructs data to which uniform quantization residue differential pulse code modulation (RDPCM) has been applied, and adding each reconstructed prediction residue to its corresponding original prediction value to produce a current block of a picture.

In another example, a method of coding video data includes generating a block of quantized residue differences, generating a reconstructed prediction residue for each quantized residue difference in the block of quantized residue differences, wherein generating includes performing inverse uniform quantization RDPCM on blocks of quantized residue differences, and adding each reconstructed prediction residue to its corresponding original prediction value to produce a current block of a picture.

In another example, a device for decoding video data includes a memory configured to store the video data and a video decoder configured to decode a block of quantized residue differences, generate a reconstructed prediction residue for each quantized residue difference in the block of quantized residue differences, wherein generating includes calculating the reconstructed prediction residues as a function of uniform quantization residue differential pulse code modulation (RDPCM), and add each reconstructed prediction residue to its corresponding original prediction value to produce a current block of the picture.

In another example, a device for encoding video data includes a memory configured to store the video data and a video encoder configured to generate a prediction residue block as a function of a picture and of a prediction block associated with the picture, generate a quantized residue differences block, wherein generating includes applying uniform quantization residue differential pulse code modulation (RDPCM) to the prediction residue block, generate a reconstructed prediction residue for each quantized residue difference in the block of quantized residue differences, wherein generating includes calculating the reconstructed prediction residues as a function of residue differential pulse code modulation (RDPCM) using uniform quantization, and add each reconstructed prediction residue to its corresponding original prediction value to produce a current block of the picture.

In yet another example, a device includes a non-transitory computer-readable medium having instructions stored thereon that, when executed, cause one or more processors to generate a block of quantized residue differences, generate a reconstructed prediction residue for each quantized residue difference in the block of quantized residue differences, wherein generating includes performing inverse quantization on blocks of quantized residue differences, wherein the inverse quantization reconstructs data to which uniform quantization residue differential pulse code modulation (RDPCM) has been applied, and add each reconstructed prediction residue to its corresponding original prediction value to produce a current block of a picture.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 4A shows a residual block.

FIG. 4B shows a quantized residual block obtained by performing RDPCM in the residual block of FIG. 4A.

DETAILED DESCRIPTION

Figure 1:
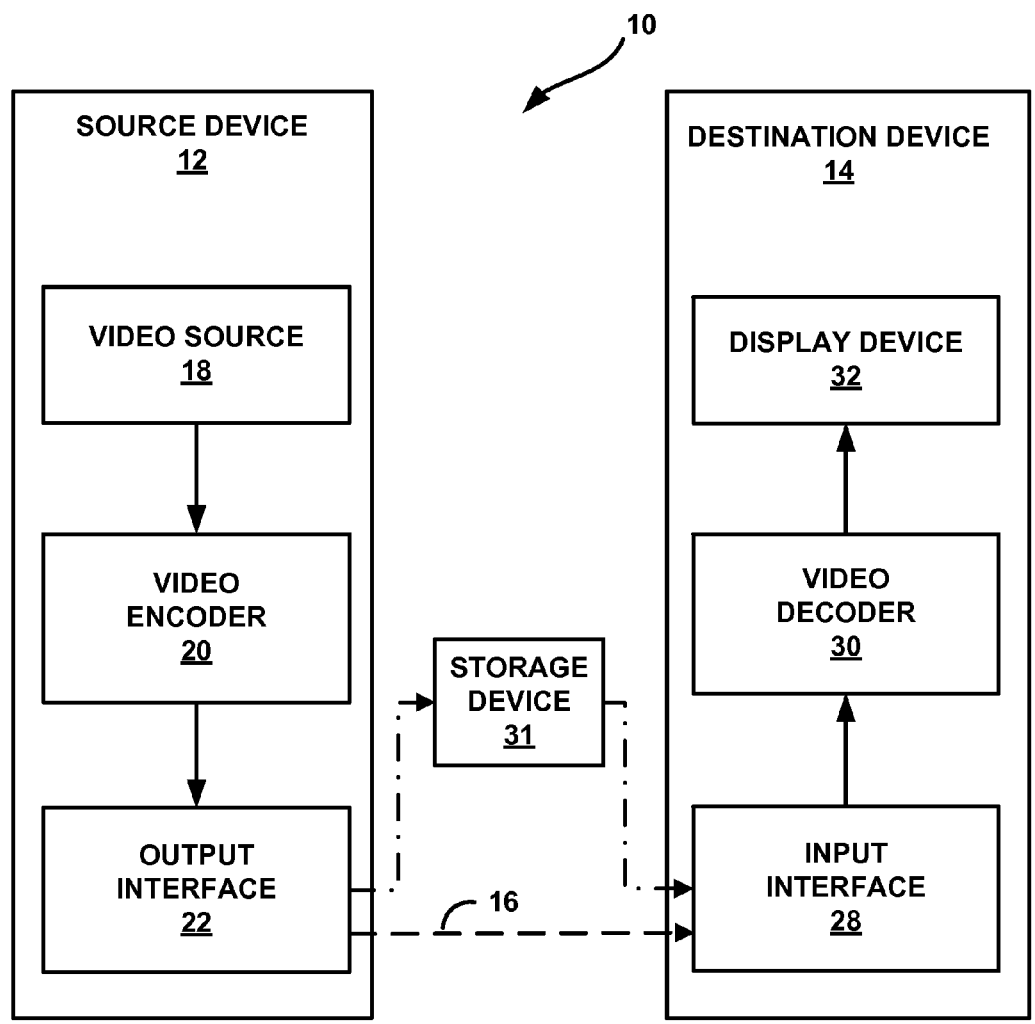
FIG. 1 is a block diagram illustrating an example video encoding and decoding system that may be configured or otherwise operable to implement or otherwise utilize one or more techniques described in this disclosure.

This disclosure describes various techniques for video coding and/or compression and, in particular, lossy coding of video data. It may be used in the context of advanced video codecs, such as extensions of HEVC or the next generation of video coding standards.

The Range Extension of HEVC, the screen contents coding extension, or other video coding tools may support intra-block copying (intra-BC) and residue differential pulse code modulation (RDPCM). With respect to intra-BC, for many applications, such as remote desktop, remote gaming, wireless displays, automotive infotainment, and cloud computing to provide a few examples, the video contents in these applications are usually combinations of natural content, text, artificial graphics and the like. In test and artificial graphics regions, repeated patterns (such as characters, icons, and symbols to provide a few examples) often exist. Intra-BC may be characterized as a dedicated process to removal of this kind of redundancy, thereby potentially improving the intra-frame coding efficiency.

In particular examples, this disclosure is related to lossy coding using RDPCM. With respect to RDPCM, a video coder (such as a video encoder or video decoder) may apply RDPCM to an intra-prediction residual (e.g., residual calculated based on a predicted block formed using one of the 35 directional HEVC intra-modes) or to a motion compensated prediction residual (e.g., residual calculated based on a predicted block formed using temporal prediction or using reconstructed spatial prediction (Intra-BC)) to reduce the amount of data of a residual block that needs to be output for the residual block. For lossy coding, quantization is applied during residue coding. RDPCM may include three different modes: RDPCM-off, RDPCM-horizontal and RDPCM-vertical. For RDPCM-off, the video coder may not apply RDPCM. For RDPCM horizontal, the video coder may use the residual samples in the left column to predict the residual samples in the current column. For RDPCM vertical, the video coder may use residual samples in the upper row to predict the residual samples in the current row.

Dead-zone plus uniform threshold scalar quantization has been used for quantization in RDPCM. Dead-zone plus uniform threshold scalar quantization is, however, designed for transform coefficient signals, which are in the frequency domain. In RDPCM, the quantization is applied to the spatial signals, which have quite different statistical characteristics. Therefore, traditional dead-zone plus uniform threshold scalar quantization may not be efficient in coding RDPCM signals. So, in one example of RDPCM approach, video encoder 20 applies a uniform quantization with rounding to all pixels, where $\alpha=Q/2$, with Q being the quantization step size and $\alpha$ being the rounding offset.

In another example RDPCM approach, different quantization step sizes are applied to different pixel locations for blocks using RDPCM. And the quantization step sizes are related via RDPCM directional mode, or related with intra/inter prediction mode.

In yet another example RDPCM approach, different quantization rounding offsets are applied to different pixel locations for blocks using RDPCM. And, in some example approaches, the quantization rounding offsets are related via RDPCM directional mode, or related with the intra/inter prediction mode. In some examples, quantizing residual values may result in fewer bits than encoding the actual residual values. In this manner, RDPCM may result in a reduction in the amount of data the video encoder needs to signal, thereby promoting bandwidth efficiency.

In one example, a video decoder decodes the received quantized residual values and reconstructs the quantized signal as a function of quantization step Q. In one such example, Q is uniform across the pixels. In another example, quantization steps Q increase or decrease as one moves across the columns (for horizontal mode), or, in another example, down the rows of the residue block (for the vertical mode).

In some examples, the video encoder may utilize RDPCM only in conjunction with certain other coding tools. For example, the video encoder may utilize lossless coding (also referred to as transform-quantization bypass coding) to generate the residual block, or may use transform-skip coding to generate a quantized version of the residual block. In some examples, the video encoder may utilize RDPCM only if the residual block is transform-bypass or transform-skip encoded. If a transform is applied to the residual block, then RDPCM may not be available to the video encoder.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 31. Similarly, encoded data may be accessed from storage device 31 by input interface. Storage device 31 may include any of a variety of distributed or locally accessed data storage media such as a hard drive. Blu-ray discs, DVDs, CD-ROMs, flash memory, volatile or non-volatile memory, or any other suitable digital storage media for storing encoded video data. In a further example, storage device 31 may correspond to a file server or another intermediate storage device that may hold the encoded video generated by source device 12. Destination device 14 may access stored video data from storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions. e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4. Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU may include a luma coding block and two chroma coding blocks. The CU may have associated prediction units (PUs) and transform units (TUs). Each of the PUs may include one luma prediction block and two chroma prediction blocks, and each of the TUs may include one luma transform block and two chroma transform blocks. Each of the coding blocks may be partitioned into one or more prediction blocks that comprise blocks to samples to which the same prediction applies. Each of the coding blocks may also be partitioned in one or more transform blocks that comprise blocks of sample on which the same transform is applied.

A size of the CU generally corresponds to a size of the coding node and is typically square in shape. The size of the CU may range from 8×8 pixels up to the size of the treeblock with a maximum of 64×64 pixels or greater. Each CU may define one or more PUs and one or more TUs. Syntax data included in a CU may describe, for example, partitioning of the coding block into one or more prediction blocks. Partitioning modes may differ between whether the CU is skip or direct mode encoded, intra-prediction mode encoded, or inter-prediction mode encoded. Prediction blocks may be partitioned to be square or non-square in shape. Syntax data included in a CU may also describe, for example, partitioning of the coding block into one or more transform blocks according to a quadtree. Transform blocks may be partitioned to be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may represent the TUs. Pixel difference values associated with the TUs may be transformed to produce transform coefficients, which may be quantized. It should be understood that the quantization techniques described in this disclosure may be performed for some blocks (e.g., blocks for which residual data is not transformed), while for other blocks, conventional quantization techniques may be performed.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure. "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Transforming and quantizing the residual block causes loss of information (e.g., inverse quantized and inverse transformed block is different than the original residual block). Accordingly, examples of video coding where the residual block is transformed and quantized are one form of lossy coding. In some examples, video encoder 20 may skip the transform of the residual block, but still quantize the residual block. An example of such video coding is transform-skip coding. Transform-skip coding is lossy coding because the quantization causes of loss of information.

Video encoder 20 need not perform lossy coding in all cases. In some examples, video encoder 20 may perform lossless coding. In lossless coding (sometimes referred to as transform bypass), video encoder 20 does not transform the residual block and does not quantize the residual block. In this example, the residual block, as reconstructed by video decoder 30, is identical to the residual block generated by video encoder 20, whereas for lossy coding and transform-skip coding, the residual block, as reconstructed by video decoder 30, may be slightly different than the residual block generated by video encoder 20.

In other words, when transform is applied, the transform converts the residual values of the residual block from a pixel domain to a transform domain. In some examples, for transform skip or transform bypass, the residual data includes residual values from the difference between the predictive block and the current block without a transform applied to the residual values that converts the residual values from a pixel domain to a transform domain.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence (e.g., or a quantized version of the original residue for lossy coding) using the data contained in the bitstream. For example, for lossy coding, video decoder 30 may entropy decode syntax elements in the bitstream to determine quantized transform coefficients. Video decoder 30 may utilize the same scan order that video encoder 20 utilized to construct a quantized residual block. Video decoder 30 may then inverse quantize the quantized transform coefficients to determine the transform coefficients. Video decoder 30 may also apply an inverse transform to the transform coefficients to determine the coefficients of the residual block.

For transform-skip coding, video decoder 30 may entropy decode syntax elements in the bitstream to determine quantized coefficients, utilize the same scan order that video encoder 20 utilized to construct a quantized residual block, and then inverse quantize the quantized coefficients to determine the coefficients of the residual block. No inverse transform is needed because the transform was skipped in the encoding process.

For lossless coding (e.g., transform bypass or simply bypass), video decoder 30 may entropy decode syntax elements in the bitstream and may utilize the same scan order video encoder 20 used to directly determine the coefficients of the residual block. No inverse quantizing or transform is needed because both transform and quantization was skipped in the encoding process.

In any case, video decoder 30 determines a predictive block. The predictive block may be located in the same picture (e.g., for intra-prediction or for intra-BC prediction) or in a different picture (e.g., for inter-prediction) as the current block. Video decoder 30 uses reconstructed pixel values in the predictive block and the corresponding residual values in the residual block (e.g., as obtained from the encoded bitstream) to reconstruct pixel values of the current block (e.g., to decode the current block).

In some instances, video encoder 20 and video decoder 30 may predict one or more residual values of a block using one or more other residual values from the block. For example, in traditional vertical RDPCM, the upper row pixel is used to predict the current pixel for each pixel in its column. In traditional horizontal RDPCM, the left column pixel is used to predict the current pixel for each pixel in its row.

In some examples, video encoder 20 may divide a residual block into one or more TUs. A "residual block" may generically refer to a block whose coefficients are to be entropy encoded (e.g., by video encoder 20) or entropy decoded (e.g., by video decoder 30). For instance, if video encoder 20 does not further divide the block resulting from the difference between the current block and a predictive block to generate a single TU, then the residual block corresponds the TU. If video encoder 20 divides the block resulting from the difference between the current block and a predictive block to generate a plurality of TUs, then the residual block corresponds to one of the plurality of TUs.

Figure 2:
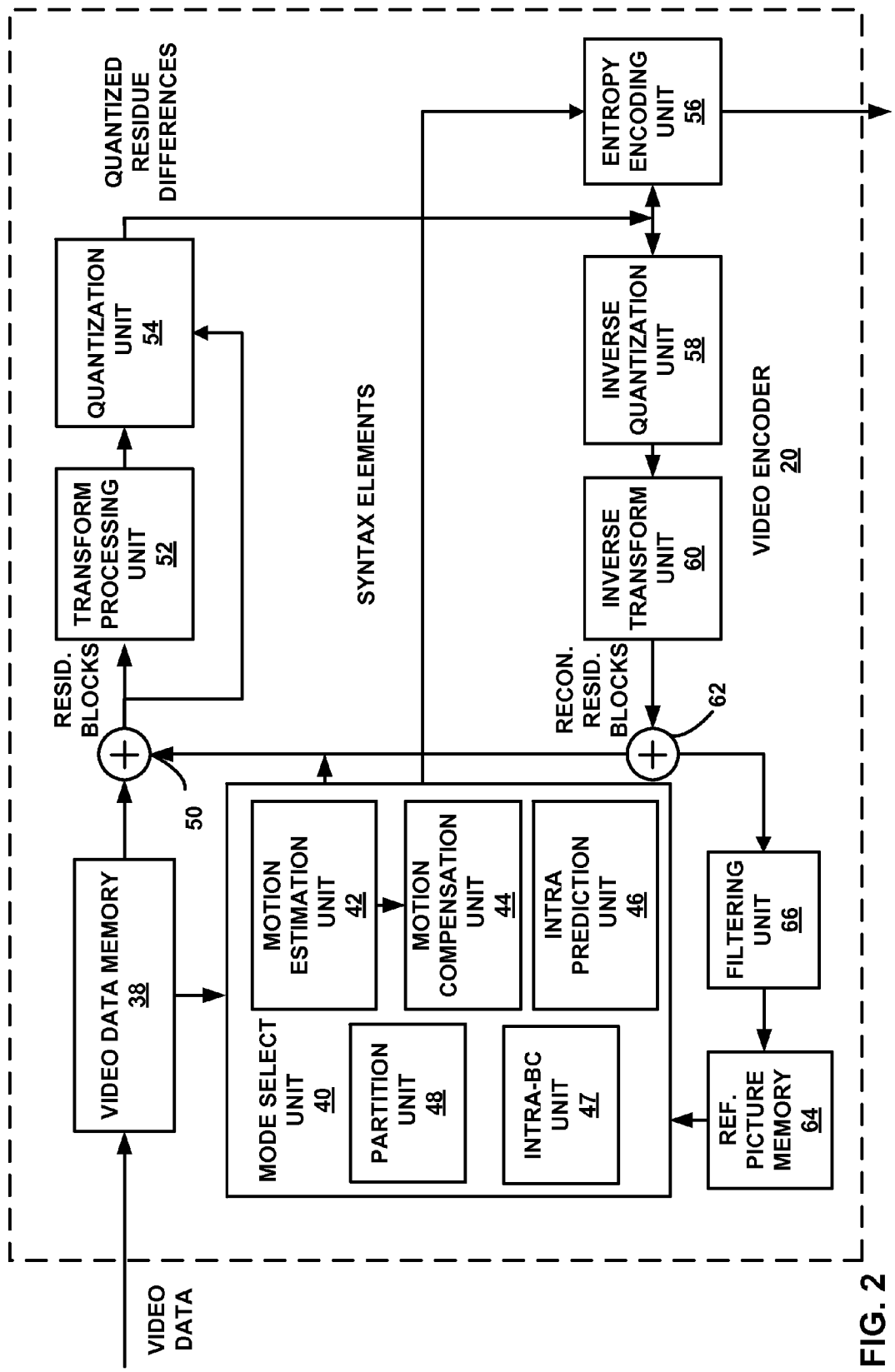
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, intra-BC unit 47, and partition unit 48. For video block reconstruction, video encoder 20 also includes inverse quantization unit 58, inverse transform unit 60, summer 62, and filtering unit 66.

Video data memory 38 may store video data to be encoded by the components of video encoder 20. The video data stored in video data memory 38 may be obtained, for example, from video source 18. Reference picture memory 64 may be referred to as a decoded picture buffer that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring pixel values in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a prediction residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a prediction residual video block by subtracting the prediction data from mode select unit 40 from the original video block being coded. Summer 50 represents the component or components that perform this subtraction operation. In RDPCM, the prediction residual block may skip transform processing unit 52 and be quantized by quantization unit 54 as described below. The resulting quantized residue differences are then entropy encoded by entropy encoding unit 56.

Transform processing unit 52 applies a transform, such as a discrete cosine transform (DCT) or a conceptually similar transform, to the prediction residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients or, for RDPCM, the quantized residue differences. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblocking. That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

While the example of FIG. 2 generally illustrates video encoder 20 as a video encoder for performing lossy coding, the techniques of this disclosure may also be applied to lossless video coding. In some examples, lossless coding eliminates transforms and quantization. In other examples, lossless coding performs transforms and eliminates only the quantization process. In still other examples, lossless coding may be implemented with the use of transforms and quantization, but the quantization parameter may be selected so as to avoid any quantization data loss. These and other examples are within the scope of this disclosure. In such instances, video encoder 20 may include components for performing transform skipping, quantization skipping, or other lossless coding techniques.

In accordance with various aspects of the techniques described in this disclosure, video encoder 20 may generate a residual block for a current block of a picture based on a difference between the current block and a prediction block of the picture. For example, intra-BC unit 47 may apply an intra-BC process to generate the residual block (as illustrated and described, for example, with respect to FIG. 4).

In some examples, Residual Differential Pulse Code Modulation (RDPCM) may be extended to lossy coding over transform blocks for which the transform is skipped (transform-skipping). Thus, summer 50 may send residual blocks to quantization unit 54, in some examples. Alternatively, transform processing unit 52 may be configured to receive data (e.g., from mode select unit 40), indicating that a certain residual block is not to be transformed. In response to such data, transform processing unit 52 may provide the residual block (without performing a transform) to quantization unit 54. In one example, lossy RDPCM is only applied to intra coded blocks with horizontal or vertical intra prediction mode, without any explicit signaling, resulting in significant BD-rate gains.

In one example, intra-BC unit 47 applies RDPCM. Video encoder 20 then encodes the modified predicted residual block by, for example, quantizing the modified predicted residual block using quantization unit 54, and entropy coding the quantized values using entropy encoding unit 56.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra-BC unit 47, motion compensation unit 44, or entropy encoding unit 56) it should be understood that one or more other units of video encoder 20 may also be responsible for carrying out such techniques.

Figure 3:
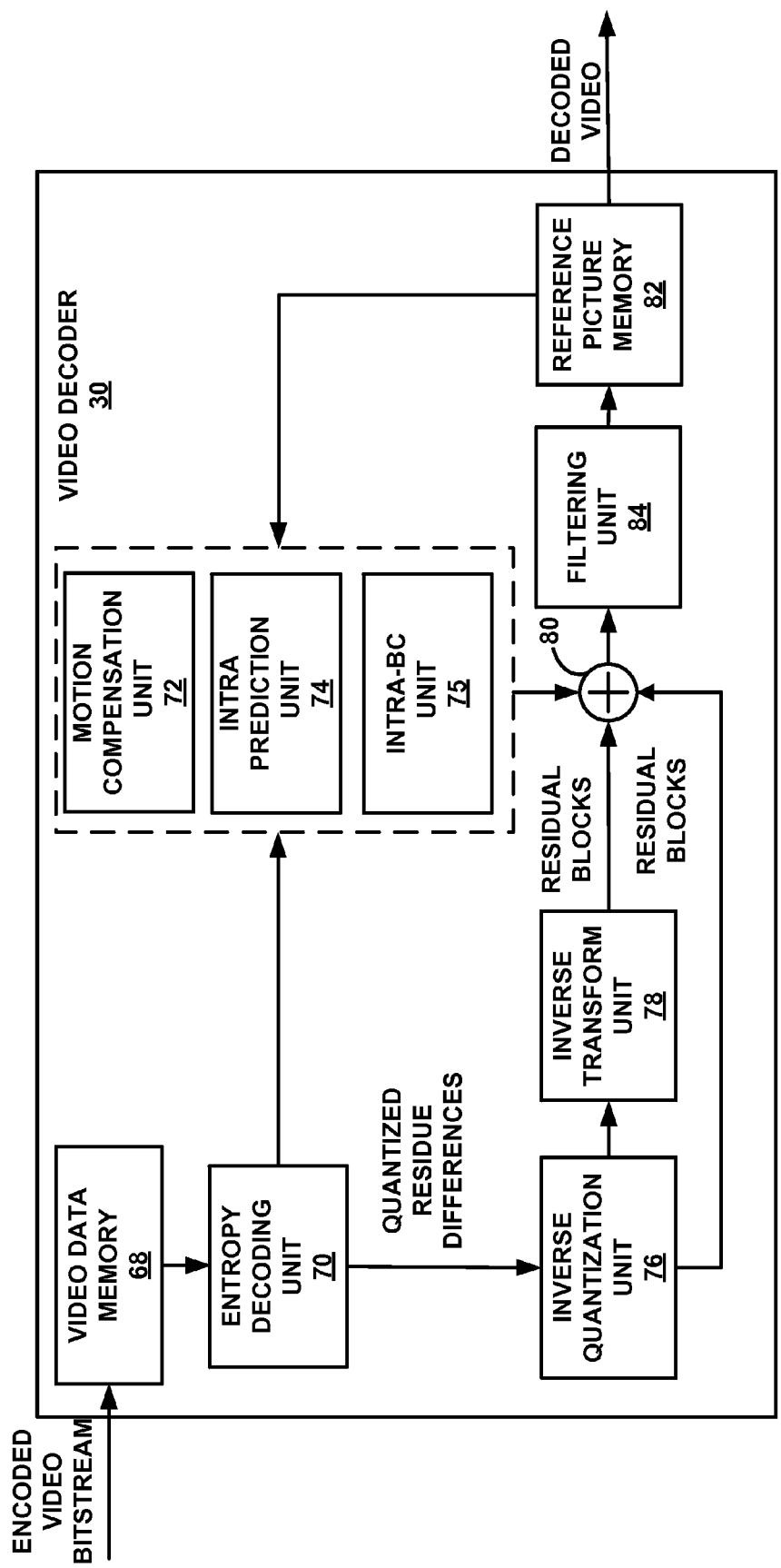
FIG. 3 is a block diagram illustrating an example video decoder that may implement the techniques of this disclosure.

FIG. 3 is a block diagram illustrating an example of video decoder 30 that may implement techniques for transformation as described in this disclosure. Again, the video decoder 30 will be described in the context of HEVC coding for purposes of illustration, but without limitation of this disclosure as to other coding standards.

In the example of FIG. 3, video decoder 30 includes video data memory 68, entropy decoding unit 70, motion compensation unit 72, intra-prediction unit 74, intra-BC unit 75, inverse quantization unit 76, inverse transformation unit 78, reference picture memory 82, summer 80, and filtering unit 84.

Video data memory 68 may store video data, such as an encoded video bitstream, to be decoded by the components of video decoder 30. The video data stored in video data memory 68 may be obtained, for example, from computer-readable medium 16, e.g., from a local video source, such as a camera, from the wired or wireless network communication of video data, or by accessing physical data storage media. Video data memory 68 may form a coded picture buffer (CPB) that stores encoded video data from an encoded video bitstream. Reference picture memory 82 may be referred to as a decoded picture buffer that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. For RDPCM, inverse quantization unit 76 inverse quantizes, i.e., de-quantizes, the quantized residue differences provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. When inverse quantization unit 76 inverse quantizes transform coefficients, inverse quantization unit 76 provides the transform coefficients to inverse transform unit 78. Alternatively, when inverse quantization unit 76 inverse quantizes residual values, inverse quantization unit 76 may provide the residual values to summer 80, bypassing inverse transform unit 78. In other examples, inverse transform unit 78 is configured to pass residual values received from inverse quantization unit 76 directly to summer 80, without performing an inverse transform. Video decoder 30 may be configured to implicitly determine that certain types of residual data are not to be inverse transformed, e.g., when the residual data corresponds to an intra-predicted PU using horizontal or vertical intra mode.

Inverse transform unit 78 applies an inverse transform. e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblocking, SAO, or other filtering operations when decoding and reconstructing video data from an encoded bitstream.

Again, as noted above with respect to FIG. 2, while the example of FIG. 3 generally illustrates video decoder 30 as a video encoder for performing lossy coding, the techniques of this disclosure may also be applied to lossless video coding. In some examples, lossless coding eliminates transforms and quantization. In other examples, lossless coding performs transforms and eliminates only the quantization process. In still other examples, lossless coding may be implemented with the use of transforms and quantization, but the quantization parameter may be selected so as to avoid any quantization data loss. These and other examples are within the scope of this disclosure. In such instances, video decoder 30 may include components for performing one or more of transform skipping, quantization skipping, or other lossless coding techniques.

In some instances, video decoder 30 may perform one or more of the techniques described with respect to video encoder 20 above. For example, video decoder 30 may perform the techniques of this disclosure for applying an RDPCM process to determine quantized residue differences. The quantized residue differences are used to form reconstructed prediction residues, and then the reconstructed prediction residues are added to the original prediction values to produce reconstructed sample values. In some examples, video decoder 30 may obtain one or more syntax elements from an encoded bitstream, and perform the techniques of this disclosure based on such syntax elements.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

Lossy Coding with RDPCM

In HEVC, after prediction, the residue is obtained by subtracting the predictor from the original signals. In lossy coding using RDPCM, spatial residue signals are quantized and predicted pixel by pixel, and no transform is applied. There are two types of RDPCM: vertical RDPCM and horizontal RDPCM.

Figures 4A, 4B:
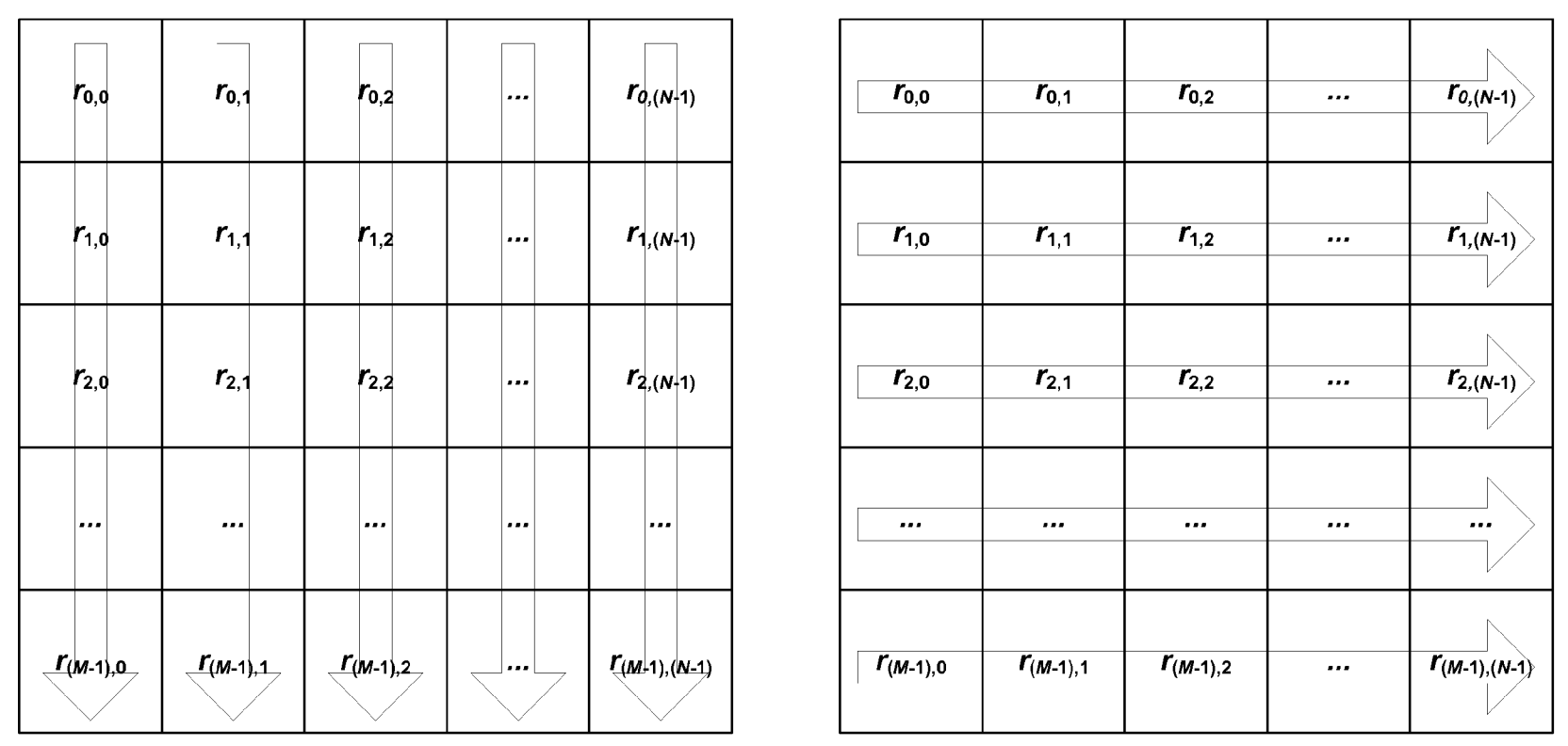

FIGS. 4A and 4B are diagrams illustrating examples of RDPCM techniques. For vertical RDPCM, the upper row pixel is used to predict the current pixel for each pixel in its column. For horizontal RDPCM, the left column pixel is used to predict the current pixel for each pixel in its row.

For example, consider a residue block of size M (rows)×N (cols). Let $r_{i,j}$, $0 \leq i \leq (M-1)$, $0 \leq j \leq (N-1)$ be the residue (e.g., prediction residual after performing inter- intra- or intra-BC prediction). The residue block may represent any component of a video block (e.g. a luma component, a chroma component, a Red component, a Green component, a Blue component (in RGB coding) or the like).

In residual DPCM, prediction is applied to the residual samples, so that a modified M×N array Δr with elements $\Delta r_{i,j}$ is obtained as follows for lossless vertical residual DPCM:

$$\Delta r_{i,j} = \begin{cases} r_{i,j}, & i = 0, 0 \leq j \leq (N-1) \\ r_{i,j} - r_{(i-1),j}, & 1 \leq i \leq (M-1), 0 \leq j \leq (N-1) \end{cases},$$

or for lossless horizontal RDPCM:

$$\Delta r_{i,j} = \begin{cases} r_{i,j}, & 0 \leq i \leq (M-1), j = 0 \\ r_{i,j} - r_{i,(j-1)} & 0 \leq i \leq (M-1), 1 \leq j \leq (N-1) \end{cases}.$$

Video encoder 20 signals the residue difference $\Delta r_{i,j}$ instead of the original residue $r_{i,j}$ in an encoded bitstream when RDPCM mode is used. As described herein, the residue differences are essentially related with adjacent residue signals since the residue difference is generated by subtracting the residue predictor from the residue signal.

The RDPCM process can be applied in both lossless and lossy cases. In other words, video encoder 20 may apply the same RDPCM process regardless of whether quantization is performed (e.g., the lossy case) or quantization is skipped (e.g. the lossless case). In some examples, video encoder 20 may extend RDPCM to the lossy case only for those TUs where the transform is skipped. In particular, for lossy RDPCM-vertical, a quantized residue difference $\Delta r_q(i, j)$ is obtained as follows $$\Delta r_q(i,j) = \begin{cases} Q(r(i,j)) & i = 0 \text{ and } 0 \leq j \leq N-1 \\ Q(r(i,j) - \hat{r}(i-1,j)) & 0 < i \leq M-1 \text{ and } 0 \leq j \leq N-1 \end{cases}$$

where $\hat{r}$ is the reconstructed prediction residue, a reconstructed version of prediction residual values r with $$\hat{r}(i,j) = \begin{cases} Q^{-1}(\Delta r_q(i,j)) & i = 0 \text{ and } 0 \leq j \leq N-1 \\ Q^{-1}(\Delta r_q(i,j)) + \hat{r}(i-1,j) & 0 < i \leq M-1 \text{ and } 0 \leq j \leq N-1 \end{cases}$$

or for RDPCM-horizontal:

$$\Delta r_q(i, j) = \begin{cases} Q(r(i, j)) & j = 0 \text{ and } 0 \leq i \leq N-1 \\ Q(r(i, j) - \hat{r}(i, j-1)) & 0 \leq i \leq M-1 \text{ and } 0 < j \leq N-1 \end{cases}$$

where $\hat{r}$ is a reconstructed version of prediction residual values r with $$\hat{r}(i, j) = \begin{cases} Q^{-1}(\Delta r_q(i, j)) & j = 0 \text{ and } 0 \leq i \leq N-1 \\ Q^{-1}(\Delta r_q(i, j)) + \hat{r}(i, j-1) & 0 \leq i \leq M-1 \text{ and } 0 < j \leq N-1 \end{cases}$$

Note that Q and $Q^{-1}$ denote forward and backward quantization, respectively and that variable Q represents the step size, while the $Q(\cdot)$ mentioned above represents the process of quantization.

The traditional dead-zone plus uniform threshold scalar quantization method is designed for transform coefficient signals, which are in the frequency domain. In RDPCM, however, the quantization is applied to the spatial signals (that is, samples in the pixel/spatial domain), which have quite different statistical characteristics. Therefore, traditional dead-zone plus uniform threshold scalar quantization may not be efficient in coding RDPCM signals. So, in one example RDPCM approach according to the present disclosure, video encoders 20 and video decoders 30 determine a quantized residue difference for each element in the prediction residual block by applying a uniform quantization to each spatial signal X as shown to obtain the corresponding quantized value $\Delta X_q$:

$$\Delta X_q = \text{floor}((X + \alpha Q)/Q)$$

with Q being the quantization step size and a being the rounding offset. The quantized residual block is then entropy encoded.

At the decoder, the entropy encoded quantized residue difference block is entropy decoded to obtain $\Delta r_q(i, j)$ and the reconstructed prediction residue $\hat{r}$ is obtained as noted above.

In one example embodiment, encoder 20 applies uniform quantization to all residual values r(i,j) in the prediction residual block. In one such example, $\alpha = Q/2$. In one example, Q is constant across the residual block.

In another example RDPCM approach, different quantization step sizes are applied to different pixel locations in the prediction residual block. In some such examples, one set of quantization steps is used when encoder 20 is in vertical RDPCM mode, while another set of quantization steps is used when encoder 20 is in horizontal RDPCM mode. Alternatively, one set of quantization steps may be used in inter frame mode, while another is used for intra frame mode.

In yet another example RDPCM approach, different quantization rounding offsets are applied to different pixel locations in the residue block. In some such examples, one set of rounding offsets is used when encoder 20 is in vertical RDPCM mode, while another set of rounding offsets is used when encoder 20 is in horizontal RDPCM mode. Alternatively, one set of rounding offsets may be used in inter frame mode, while another is used for intra frame mode.

Uniform quantization will be described first. In the next examples, quantization is described in the context of a 4×4 block of pixels. After quantization, the 16 residue pixels are denoted as $\Delta r_q(i, j)$ with i, j=0, 1, 2, 3.

In one uniform quantization example, the encoding/decoding device uses a uniform quantization for RDPCM mode with $\alpha = \frac{1}{2}$, where α is the rounding offset. And thus the rounding offset is $\alpha Q = Q/2$, where Q is the quantization step. Specifically, if the current block uses RDPCM modes, the following uniform quantization is applied to the spatial signals X with quantization step size Q and the corresponding quantized residual value $\Delta r_q(i, j)$ is obtained using either horizontal or vertical RDPCM as described above but with quantization of the form:

$$\Delta X_q = \text{floor}(X + \alpha Q)/Q) \text{ where } \alpha \text{ is } \frac{1}{2}.$$

In another example, in the vertical RDPCM mode, a quantization step size QStep0=14 is applied to the first row pixel locations X0,0, X0,1, X0,2, X0,3. And a relative larger QStep1=15 is applied to the second row pixel X1,0, X1,1, X1,2, X1,3. And QStep2=16 is applied to the third row pixel X2,0, X2,1, X2,2, X2,3. And QStep3=17 is applied to the fourth row X3,0, X3,1, X3,2, X3,3.

In some examples, quantization step values are stored in sets. In some such examples, one set of quantization step values is used in vertical RDPCM mode, while another set of quantization steps is used in horizontal RDPCM mode. In other such examples, one set of quantization step values is used in inter frame mode, while another set of quantization step values is used in intra frame mode.

In yet another example, in the vertical RDPCM mode, a quantization offset $\alpha_0 = \frac{1}{4}$ is applied to the first row pixel locations X0,0, X0,1, X0,2, X0,3. And a relative larger $\alpha 1 = \frac{1}{5}$ is applied to the second row pixel X1,0, X1,1, X1,2, X1,3. And $\alpha 2 = \frac{1}{6}$ is applied to the third row pixel X2,0, X2,1, X2,2, X2,3. And $\alpha 1 = \frac{1}{7}$ is applied to the fourth row X3,0, X3,1, X3,2, X3,3.

In some examples, quantization offsets are stored in sets. In some such examples, one set of quantization offsets is used in vertical RDPCM mode, while another set of quantization offsets is used in horizontal RDPCM mode. In other such examples, one set of quantization offsets is used in inter frame mode, while another set of quantization offsets is used in intra frame mode.

Figure 5:
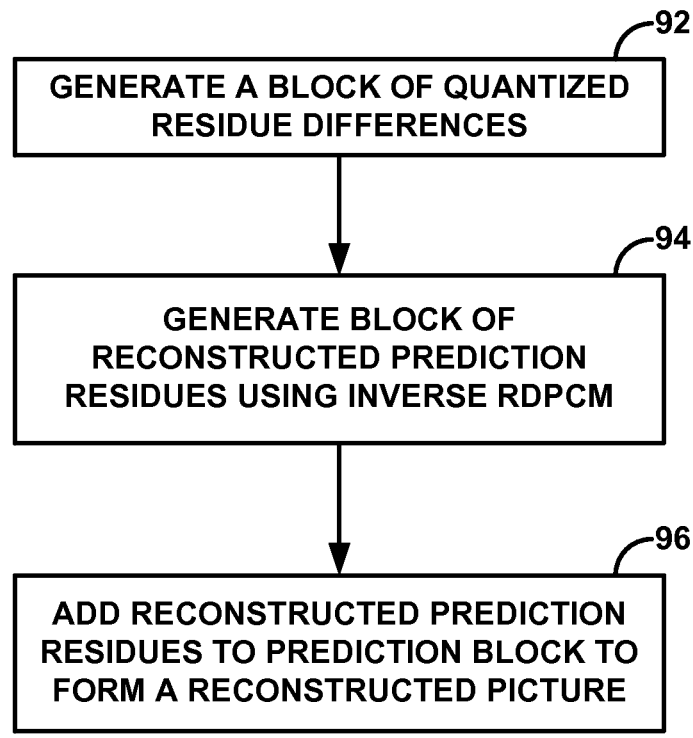
FIG. 5 is a flowchart illustrating an example technique of coding video data in accordance with this disclosure.

FIG. 5 is a flowchart illustrating exemplary operation of a coding device, such as video encoder 20 shown in the example of FIG. 2 or decoder 30 shown in the example of FIG. 3, in performing the techniques described in this disclosure. While described with respect to video encoder 20 and video decoder 30, it should be understood that the techniques of FIG. 5 may be carried out by a variety of other devices having a variety of other processing capabilities.

In the example of FIG. 5, a device generates a block of quantized residue differences at 92. For a decoder like decoder 30, generating includes entropy decoding the encoded bitstream. For and encoder like encoder 20, generating includes applying a uniform quantization RDPCM method to a prediction residual block. In one example, uniform quantization is applied to the spatial signals X with quantization step size Q and the corresponding quantized residual value $\Delta r_q(i, j)$ is obtained using either horizontal or vertical RDPCM as described above but with quantization of the form:

$$\Delta X_q = \text{floor}((X + \alpha Q)/Q)$$

where, in some examples, α is ½.

At 94, a device generates a block of reconstructed prediction residues using inverse uniform quantization RDPCM. At 96, a device adds the reconstructed prediction residues to a prediction block to form a reconstructed picture.

Figure 6:
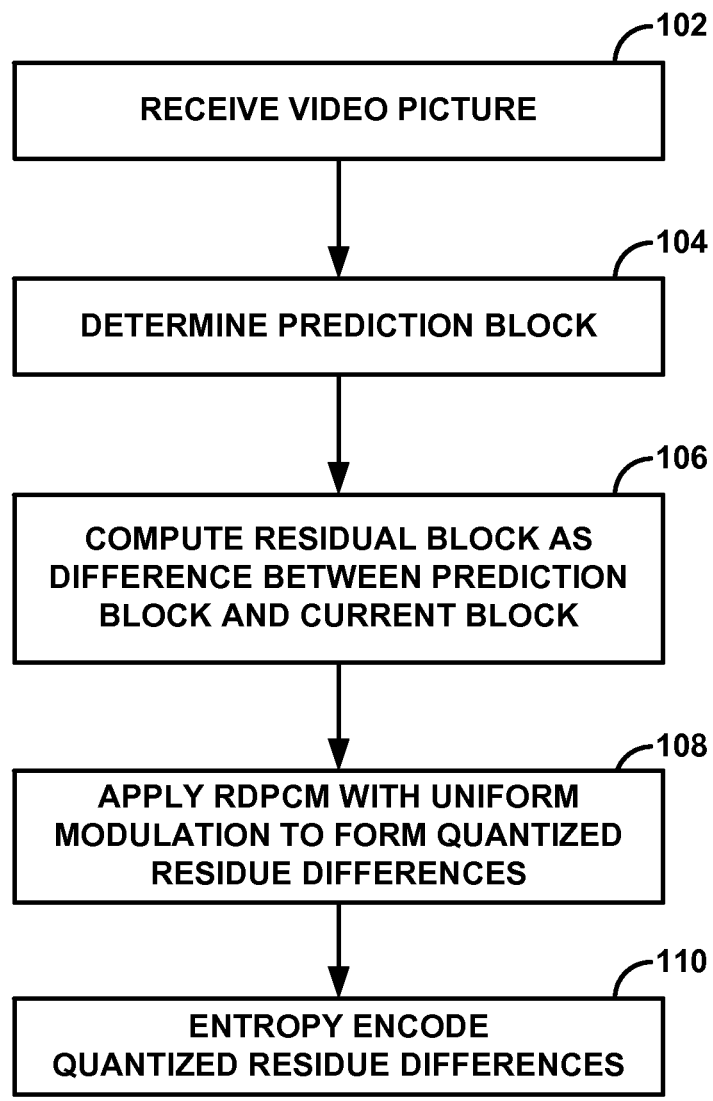
FIG. 6 is a flowchart illustrating an example technique of encoding video data in accordance with this disclosure.

FIG. 6 is a flowchart illustrating exemplary operation of a video encoding device, such as video encoder 20 shown in the example of FIG. 2, in performing the techniques described in this disclosure. While described with respect to video encoder 20, it should be understood that the techniques of FIG. 6 may be carried out by a variety of other devices having a variety of other processing capabilities.

In the example of FIG. 6, video encoder 20 receives a video picture or slice to be coded (102). Encoder 20 determines a prediction block (104) and determines the difference between the prediction block and the current block (106). In one such example, Intra-BC unit 47 may determine the prediction block as the block that results in the least amount of residual or, in other words, smallest difference between the block and the current CU.

In one example, intra-BC unit 47 may determine the offset vector based on the prediction block and the current block. Intra-BC unit 47 may pass the offset vector to entropy encoding unit 56, which entropy encodes the offset vector and adds the encoded offset vector to the bitstream. Summer 50 may determine a prediction residual block as the difference between the prediction block and the current block (106).

According to aspects of this disclosure, quantization unit 54 quantizes the residual values (108) as discussed above. In one example, uniform quantization is applied to the spatial signals X with quantization step size Q and the corresponding quantized residual value $\Delta r_q(i, j)$ is obtained using either horizontal or vertical RDPCM as described above but with quantization of the form:

$$\Delta X_q = \text{floor}((X+\alpha Q)/Q)$$

where, in some examples, $\alpha$ is $\frac{1}{2}$.

Following quantization, entropy encoding unit 56 entropy encodes (which refers to statistical lossless coding, as one example) the quantized residue differences values (110) and includes the entropy encoded quantized residue differences values in the bitstream. This process iterates until all of the blocks of the video picture are encoded, although not all of the block may be encoded using an intra-BC process.

While certain techniques may be ascribed to certain units of video encoder 20, it should be understood that one or more other units of video encoder 20 may also be responsible for carrying out such techniques.

Figure 7:
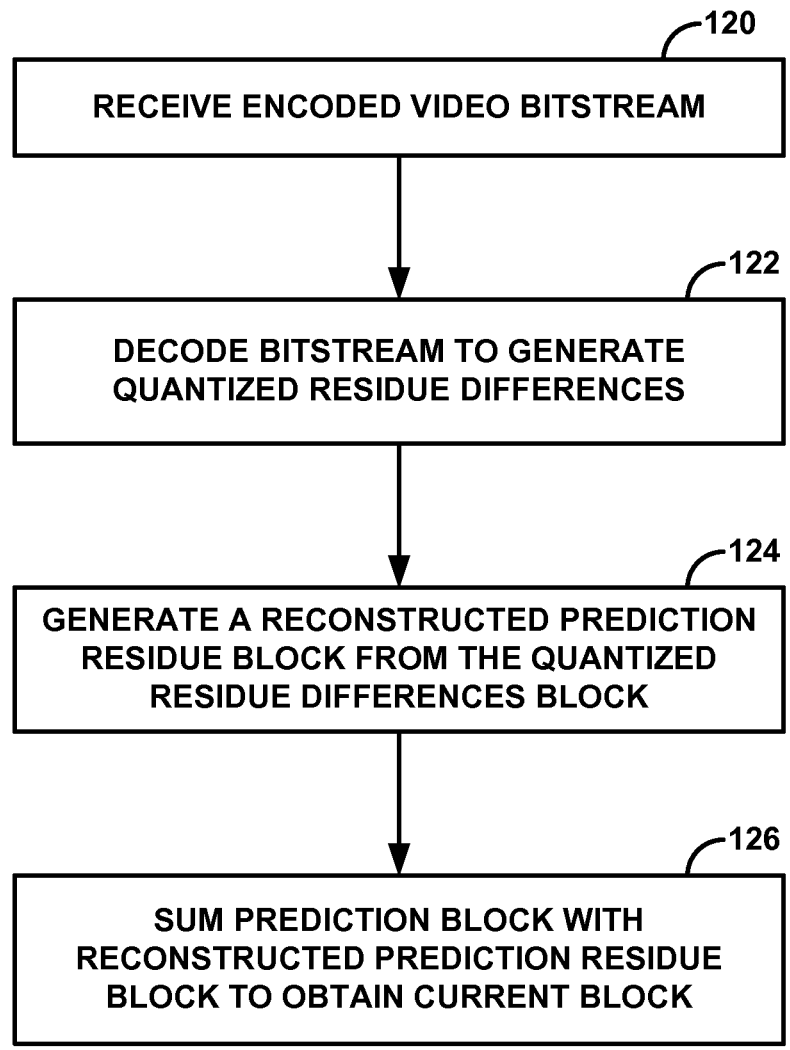
FIG. 7 is a flowchart illustrating an example technique of decoding video data in accordance with this disclosure.

FIG. 7 is a flowchart illustrating exemplary operation of a video decoding device, such as video decoder 30 shown in the example of FIG. 3, in performing the techniques described in this disclosure. Again, while described with respect to video decoder 30, it should be understood that the techniques of FIG. 7 may be carried out by a variety of other devices having a variety of other processing capabilities.

Initially, video decoder 30 receives an entropy encoded video bitstream (120) that represents video blocks of an encoded video slice and associated syntax elements from video encoder 20. Entropy decoding unit 70 of video decoder 30 entropy decodes the bitstream to generate a quantized residue differences block (122). While the process shown in the example of FIG. 7 is described with respect to a lossy coding process (which had quantization applied to the residue), as noted above, the techniques may also be performed in lossless video coding by, for instance, setting Q=1 and $\alpha$=0.

In the case of lossy encoding, entropy decoding unit 70 forwards the decoded quantized residue differences values to inverse quantization unit 76, where a block of reconstructed prediction residues is generated using inverse uniform quantization RDPCM (124). The block of reconstructed prediction residues is then passed on to summer 80, where the reconstructed prediction residues are added to the prediction block to arrive at a sampled version $x_s(i,j)$ of the original video stream $x(i,j)$ (126).

In one example, intra-BC unit 75 identifies a prediction block stored to reference picture memory 82 (or some other intermediate memory) based on an offset vector and provides this prediction block to summer 80.

While certain techniques may be ascribed to certain units of video decoder 30, it should be understood that one or more other units of video decoder 30 may also be responsible for carrying out such techniques.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently. e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. As used herein, the term 'signaling' may include storing or otherwise including data with an encoded bitstream. In other words, in various examples in accordance with this disclosure, the term 'signaling' may be associated with real-time communication of data, or alternatively, communication that is not performed in real-time.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   subtracting a prediction block from a current block of a picture to form a prediction residual block; and
   applying a Residue Differential Pulse-Code Modulation (RDPCM) process to the prediction residual block, wherein applying the RDPCM process comprises:
   for each respective residue pixel in the prediction residual block other than residue pixels in a first row or first column of the prediction residual block:
   calculating a respective residue difference by subtracting a reconstructed left or above neighbor residue pixel from the respective residue pixel;
   generating a respective quantized residual difference by applying a uniform quantization to the respective residue difference according to a formula:

$$\Delta X_q = \text{floor}\left(\frac{X + \alpha Q}{Q}\right)$$

where X is the respective residue difference, $\Delta X_q$ is a quantized value, floor is a floor function, Q is a quantization step, and a is a quantization offset, wherein $\alpha$ is equal to ½; and
   entropy encoding the quantized value.

2. The method of claim 1, wherein the quantization step is a constant.

3. The method of claim 1, wherein the quantization step increases or decreases down rows of the prediction residual block.

4. The method of claim 1, wherein the quantization step increases or decreases across columns of the prediction residual block.

5. The method of claim 1, wherein a value of the quantization step is dependent on a direction mode of the RDPCM process.

6. The method of claim 1, wherein a value of the quantization step is dependent on whether the prediction block is generated using an inter prediction mode or an intra prediction mode.

7. The method of claim 1, wherein applying the RDPCM process further comprises:
   for each respective residue pixel in the first row or the first column of the prediction residual block:
   quantizing the respective residual pixel according to the quantization formula to generate a quantized version of the respective residual pixel;
   entropy coding the quantized version of the respective residual pixel;
   inverse quantizing the quantized version of the respective residual pixel to generate a reconstructed version of the respective residual pixel; and
   for each residue pixel of the prediction residual block not in the first row or the first column of the prediction residual block:
   entropy coding the respective quantized residual difference; and
   generating a reconstructed version of the respective residual pixel at least in part by inverse quantizing the respective quantized residual difference and adding the inverse quantized residual difference to a reconstructed version of a left or above neighbor residual value.

8. A device for encoding video data, the device comprising:
   a memory configured to store the video data; and
   a video encoder configured to:
   subtracting a prediction block from a current block to generate a prediction residual picture; and
   apply a Residue Differential Pulse-Code Modulation (RDPCM) process to the prediction residual block, wherein as part of applying the RDPCM process to the prediction residual block, for each respective residue pixel in the prediction residual block other than the residue pixel in a first row or first column of the prediction residual block, the video encoder:
   calculates a respective residue difference by subtracting a reconstructed left or above neighbor residue pixel from the respective residue pixel;
   generates a respective quantized residual difference by applying a uniform quantization to the respective residual difference according to a formula:

$$\Delta X_q = \text{floor}\left(\frac{X + \alpha Q}{Q}\right)$$

where X is the respective residue difference, $\Delta X_q$ is a quantized value, floor is a floor function, Q is a quantization step, and a is a quantization offset, wherein α is equal to ½; and entropy encoding the quantized value.

9. The device of claim 8, wherein the quantization step is a constant.

10. The device of claim 8, wherein one or more of:
the quantization step increases or decreases down rows of the prediction residual block, or
the quantization step increases or decreases across columns of the prediction residual block.

11. The device of claim 8, wherein the video encoder is configured such that, as part of applying the RDPCM process, the video encoder:
for each respective residue pixel in the first row or the first column of the prediction residual block:
 quantizes the respective residual pixel according to the quantization formula to generate a quantized version of the respective residual pixel;
 entropy codes the quantized version of the respective residual pixel;
 inverse quantizes the quantized version of the respective residual pixel to generate a reconstructed version of the respective residual pixel by; and
for each residue pixel of the prediction residual block not in the first row or the first column of the prediction residual block:
 entropy codes the respective quantized residual difference; and
 generates a reconstructed version of the respective residual pixel at least in part by inverse quantizing the respective quantized residual difference and adding the inverse quantized residual difference to a reconstructed version of a left or above neighbor residual value.

12. A non-transitory computer-readable medium having instructions stored thereon that, when executed, cause one or more processors to:
subtract a prediction block from a current block of a picture to form a prediction residual block; and
apply an Residue Differential Pulse-Code Modulation (RDPCM) process to the prediction residual block, wherein applying the RDPCM process comprises:
for each respective residue pixel in the prediction residual block other than residue pixels in a first row or first column of the prediction residual block:
 subtract a reconstructed left or above neighbor residue pixel from the respective residue pixel to calculate a respective quantized residue difference; and
 generate a respective quantized residual difference by applying a uniform quantization to the respective residual difference according to a formula:

$$\Delta X_q = \text{floor}\left(\frac{X + \alpha Q}{Q}\right)$$

where X is the respective residue difference, $\Delta X_q$ is a quantized value, floor is a floor function, Q is a quantization step, and a is a quantization offset, wherein α is equal to ½; and entropy encoding the quantized value.

13. The non-transitory computer-readable medium of claim 12, wherein one or more of:
the quantization step increases or decreases down rows of the prediction residual block, or
the quantization step increases or decreases across columns of the prediction residual block.

* * * * *